United States Patent [19]

Roberts

[11] Patent Number: 4,492,386
[45] Date of Patent: Jan. 8, 1985

[54] TRAILER SAFETY DEVICE

[76] Inventor: Hardy G. Roberts, 2790 Oneida La., Provo, Utah 84604

[21] Appl. No.: 503,301

[22] Filed: Jun. 10, 1983

[51] Int. Cl.³ ............................................. B60D 1/12
[52] U.S. Cl. .............................. 280/507; 24/241 SL; 280/510; 280/515; 294/82 R
[58] Field of Search ............... 280/507, 511, 515, 457, 280/504, 487, 485, 477, 475, 510; 24/233, 241 P, 241 SL, 241 PS; 294/82 R

[56] References Cited

U.S. PATENT DOCUMENTS

| 1,411,230 | 3/1922 | Weber | 280/504 |
|---|---|---|---|
| 1,860,391 | 5/1932 | Meyer | 280/477 |
| 2,491,143 | 12/1949 | Weiss | 280/504 |
| 2,842,380 | 7/1958 | Weiss | 280/504 |
| 3,169,784 | 2/1965 | Lorimor | 280/507 |
| 3,204,985 | 9/1965 | Karnath et al. | 280/504 |
| 3,475,037 | 10/1969 | Weiss | 280/504 |
| 3,770,298 | 11/1973 | Phillips | 280/457 |
| 3,790,192 | 2/1974 | Green | 280/507 |
| 3,794,357 | 2/1974 | Frye | 280/515 |

FOREIGN PATENT DOCUMENTS 604660  7/1948  United Kingdom ................ 280/515

Primary Examiner—Joseph F. Peters, Jr.
Assistant Examiner—Mitchell J. Hill
Attorney, Agent, or Firm—Workman, Nydegger & Jensen

[57] ABSTRACT

A trailer safety device for use in conjunction with a trailer hitch is provided having a bracket assembly from which a free-swinging body assembly is suspended. The bracket assembly and body assembly are positioned in spaced relationship above the trailer hitch to prevent inadvertant or accidential opening of the trailer hitch. The free-swinging body assembly is permitted to swing freely between points of constraint defined by inhibitors such as a bracket shoulder or an inhibitor latch. In this manner, a substantial portion of the body assembly remains positioned directly above the trailer hitch to block its opening and the body assembly absorbs shocks and jolts by swinging to and fro. To open the trailer hitch, the body assembly is manually retracted to one side of its swinging arc thereby enabling the trailer hitch to open.

17 Claims, 4 Drawing Figures

TRAILER SAFETY DEVICE

The present invention relates to hitch devices, and more particularly to apparatus for preventing the accidental disengagement of a hitch device.

BACKGROUND OF THE INVENTION

For many years now, the trucking industry has served this nation by transporting goods throughout the country. The trucking industry has grown in importance and sophistication. Trucks towing tailers laden with goods are seen everywhere on the highways, and the goods transported provide the very lifeblood of many communities which have no access to other forms of freight transportation.

As the trucking industry has grown, it has become increasingly more important to provide safety features for the trucks and trailers. The truck and trailer operators share the highways with the public, and thus, they also share the responsibility to make travel on the highways as safe as possible.

Of course, one of the primary areas for safety concerns is the means by which a trailer is coupled to a truck or another trailer. These coupling means must be able to withstand pulling, jolting, and twisting forces in almost every conceivable direction because a truck and trailer rig in use is constantly encountering bumps, turns, speed changes, etc. which cause such inevitable, but unpredictable forces. Inferior hitch devices have caused some serious accidents when they have failed to retain a trailer in tow. It is difficult to imagine something more frightening than encountering a runaway, fully-loaded truck trailer which is rolling down the highway without brakes or steering. But, this is exactly what happens when the hitch device fails and accidentally releases the trailer.

Because of such safety concerns and various practical problems, many different types of hitch devices have been developed over the years. There have been tongue and pin, hook and eye, ball and socket, and pintle hook hitch devices, among others. Each type of hitch device has its advantages and its disadvantages.

The tongue and pin hitch device is a simple device having a few component parts and is frequently used to connect farm equipment. It is easy to engage by aligning a hole in a trailer or wagon tongue over a hole in a corresponding tongue on the tractor or truck and by dropping a pin or bolt therethrough. The pin prevents the tongues from pulling apart. However, in use, the pin sometimes breaks under the strain of extreme forces exerted directly on the pin or the pin bounces or works its way upward out of the tongue holes. In either case, the pin fails and releases the tongues from each other. To prevent displacement of the pin, a nut may be threaded onto the pin or bolt or a cotter pin may be threaded through a bore in the pin to inhibit upward displacement of the pin. Such precautions have not been entirely successful.

The hook and eye hitch device is another rather simple device which is easy to use. One simply places a draw bar with an eye fixed to one vehicle over a hook fixed to the other vehicle and a connection is complete. Again, however, when the hook and eye hitch device is jostled about during use, it is not uncommon for the eye to work its way free from the hook and cause disengagement of the trailer.

The ball and socket hitch device is commonly used with smaller trailers such as travel trailers, horse trailers, small self-haul moving trailers, and the like. The ball and socket hitch works on a principle that the socket connected to a trailer tongue clamps down on a ball such that vertical movement of the socket is inhibited but swinging or rotating movement in a substantially horizontal direction is not. This enables the trailer to take turns and to absorb some of the shocks incident to towing a trailer. To assure that the socket remains clamped to the ball, many different types of locking mechanisms have been used, most of which cause a lip or flange to encircle the underside of the ball. The lip or flange is designed to grasp the ball if the socket is forced to move vertically, thereby preventing disengagement. Despite the various types of locking mechanisms used to secure ball and socket hitch devices, it is not uncommon for the locking mechanism to fail and have the trailer free itself during use.

Due to the failings and limitations of the above-mentioned hitch devices, such devices are usually not suitable for use in the trucking industry. A heavy duty, dependable hitch device must be used. To accomplish the needs of the trucking industry, the pintle hook hitch device has been designed and improved over the years. The pintle hook hitch is similar to the hook and eye hitch discussed above, but it is more sturdy and it has a retainer arm which opens and closes the mouth of the hook portion called the pintle. The retainer arm is usually movable in a vertical direction on a pivot pin or shaft and movement is activated by a lever or handle. Thus, when the retainer arm is in its vertical or upright position the hook is open to receive a coupling eye. Then, the retainer arm can be swung to its closed position whereby the coupling eye is secured within the grasp of the hook and vertical movement of the coupling eye is limited.

To assure that the retainer arm remains in its closed position while a trailer is being towed, a number of locking mechanisms have been used. Some of the locking mechanisms are internal of the pintle hook such as that illustrated in U.S. Pat. No. 2,842,380 entitled "Double Lock Trailer Coupling" issued to D. S. Weiss on July 8, 1958, and some employ external apparatus such as that illustrated in U.S. Pat. No. 3,475,037 also entitled "Double Lock Trailer Coupling" issued to D. S. Weiss on Oct. 28, 1969.

With respect to internal locking mechanisms, some significant drawbacks have been encountered. Internal locking mechanisms are not easily accessible for repair in the event of a malfunction. Also, such mechanisms are not visible to the eye; thus, a user can never be absolutely certain that the mechanism is fully engaged. On occasion, retainer arms have not actually been locked into position even though they appeared to be secure from outward appearances. Most significantly, internal locking mechanisms must be installed during fabrication of the pintle hook device and cannot be added as a safety accessory at a later time. Further, under the tremendous forces, jolting and jarring that occur during use, such internal locking mechanisms have been known to break or fail for one reason or another. In some of those cases, the retaining arm is released, or is sheared off, disengaging the coupling and creating the extremely dangerous runaway trailer situation.

The external locking mechanisms have also presented some drawbacks. Typically, such mechanisms require secondary retaining arms which hold the retaining arm in position. Thus, the exterior design of the pintle hook device is altered such that the secondary retaining arm must be installed during fabrication of the pintle hook device. Consequently, such external locking mechanisms cannot be added to an existing pintle hook device. Additionally, safe operation of external locking mechanisms to avoid pinching of fingers, etc. frequently requires more than one person. Further, such locking mechanisms do not solve the problem where the retainer arm is sheared off due to forces encountered during use.

It is an object of the present invention to provide an improved safety mechanism for hitch devices, and in particular, hitch devices of the pintle hook type.

Another object of the present invention is to provide a safety mechanism which is external of the pintle hook device that can be installed as an accessory of an existing pintle hook device.

A further object of the present invention is to provide a safety mechanism which is easy to operate by one person.

Still another object of the present invention is to provide a safety mechanism which compensates for and is able to withstand the forces, jolting and jarring encountered during use in towing a trailer.

A further object of the present invention is to provide a safety mechanism which will reduce the likelihood of the coupling becoming disengaged either through unintended release or through the shearing off of the retaining arm.

Another object of the present invention is to provide a safety mechanism that will automatically—without the operator's intervention or action—fall into a safety locking position when the pintle hook device is closed.

A further object of the present invention is to provide a safety mechanism which the operator can easily and readily see is in a safety locking position.

An additional object of the present invention is to provide a safety mechanism which can be used in conjunction with other safety locking mechanisms to impart additional security into use of the hitch device.

These and other objects and features of the present invention will become more fully apparent from the following description and appended claims taken in conjunction with the accompanying drawings.

SUMMARY OF THE INVENTION

The trailer safety device of the present invention eliminates many of the disadvantages discussed above, and provides a safety mechanism which is easy to use and which reduces the likelihood of the trailer coupling becoming unintentionally disengaged. The trailer safety device, which can be mounted onto a truck trailer or the like by use of a mounting support, comprises a bracket which houses a suspension pin from which a free-swinging body member is suspended. The body member has a shield plate affixed to its lowermost portion and an inhibitor latch. The bracket has a shoulder which inhibits a full free swing of the body member in one direction and the inhibitor latch can be used to inhibit a full free swing of the body member in the other direction.

In use, the trailer safety device is positioned directly above the movable retaining arm of a pintle hook hitch device by the mounting support such that the free-swinging body member swings near, but not contacting the retaining arm. Such swinging movement of the body member is in a plane that is transverse to the direction that the retaining arm will move. Thus, the body member, with its shield plate, lies directly in the movement path of the retaining arm, thereby preventing the retaining arm from assuming its open position.

The shoulder of the bracket blocks the swinging movement of the body member in one direction so that when the body member swings to that direction, a substantial portion of the body member remains directly above the retaining arm because the body member is being prevented from swinging completely out of the movement path of the retaining arm. The inhibitor latch is positioned on the body member such that it normally protrudes below the shield plate and will engage the retaining arm in contact when the body member swings in the direction opposite that discussed above. In this manner, the body member is free to swing to and fro between its contact with the shoulder of the bracket and the contact of the inhibitor latch with the retaining arm. Consequently, during use, the body member with its swinging motion can easily absorb shocks and jolts incident to towing a trailer and still remain positioned directly above the pintle hook retaining arm to prevent it from opening accidentally.

When it is desired that the retaining arm of the pintle hook device be opened, the user simply manually moves the inhibitor latch out of the way so that it no longer protrudes below the shield plate. The entire body member can then be easily retracted to the side so that it no longer prevents the retainer arm from opening. With the retainer arm in the open position, the coupling eye of a trailer draw bar can be inserted over or removed from the pintle or hook portion of the pintle hook device. The body member remains positioned out of the way by the open retaining arm. Once the coupling eye of the trailer bar is positioned over the pintle, the retainer arm is closed and the body member automatically drops into its locking position above the retainer arm. Thus, there is little danger of pinching or other injury to the user and the procedure explained can be easily performed by one person. Further, the entire trailer safety device is external; and therefore, it is within view of and readily accessible to the user.

In the preferred embodiment of the trailer safety device, the shield plate is curved so that it may swing to and fro without contact with the closed retaining arm. The body member has the inhibitor latch to restrain over-swinging in one direction. However, it should be understood that these features are not required. The shield plate may be straight or angled rather than curved. If angled, the body member should be suspended from the suspension pin in a fashion offset from center. This keeps the shield plate near the retaining arm and distributes the weight of the body member such that it tends more readily to return, under the force of gravity, to its position above the retaining arm. Also, due to gravity and the point of suspension, the equilibrium position of the body member is directly over the retainer arm. Thus, the body member is not likely to swing too far in one direction in the absence of the inhibitor latch, and if it does swing too far it will immediately swing back oscillating closely about the equilibrium position. Further, the angled configuration permits the shield plate to assume close disposition to the retainer arm, during swinging, yet also permits the body member to be swung to the side so the retainer arm may be opened.

The present invention's construction and configuration gives it a resiliency and versatility not enjoyed by other safety devices. It can be added external of the pintle hook hitch device as a safety accessory without modification to the existing pintle hook device. The mounting support is merely adapted for compatibility with the various designs of pintle hook devices. Being mounted external to the pintle hook device, it works cooperatively with other safety features such as internal locking mechanisms and it is readily accessible and easy to use. The trailer safety device of this invention also has the capability to withstand the shocks and jolts incident to towing a trailer without compromising its safety features. Further, because the shield plate is positioned above the retaining arm, a severe jolt which might ordinarily shear off the retaining arm is less likely to cause such a shearing because the retainer arm has back-up support from the trailer safety device of this invention.

BRIEF DESCRIPTION OF THE DRAWINGS

For a more complete understanding of this invention, reference should now be made to the embodiment illustrated in greater detail in the accompanying drawings as described below. In the drawings.

DETAILED DESCRIPTION OF THE PREFERRED EMBODIMENT

Figure 1:
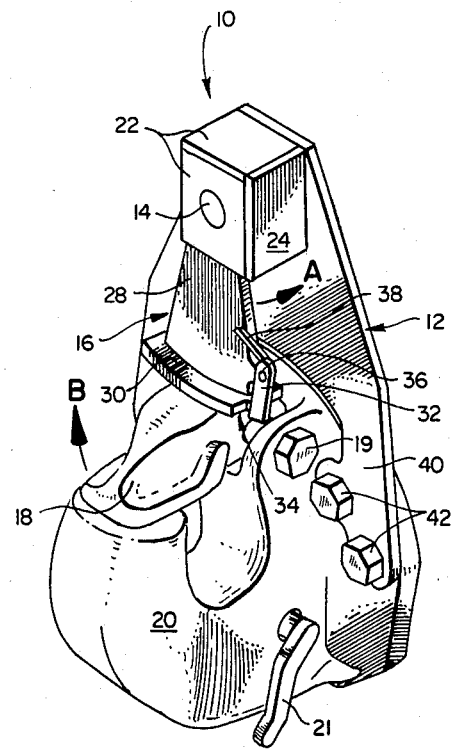
FIG. 1 is a perspective view of the trailer safety device of this invention mounted above a typical pintle hook hitch device showing the free-swinging body member abutted against the shoulder of the bracket.

Referring now to the drawings, the trailer safety device of the present invention comprises a bracket assembly 10 fixed to a mounting support 12, a suspension pin 14 and a free-swinging body assembly 16 which is suspended from said bracket assembly 10 to prevent the vertical movement of a retainer arm 18 of a pintle hook hitch device 20.

As with most pintle hook hitch devices 20, the retainer arm 18 is movably attached to the pintle hook device 20 by a retainer pin 19 which permits the retainer arm 18 to move in a travel path as shown by arrow B. The movement of retainer arm 18 is actuated via a mechanism controlled by a handle 21.

The bracket assembly 10 comprises a bracket 22 which houses the suspension pin 14 and has a shoulder 24. The shoulder 24 of bracket 22 is positioned to block full swinging movement of the body assembly 16 in the direction of the shoulder 24. As shown in FIG. 1, when the body assembly 16 contacts the shoulder 24, further swinging movement in the direction of arrow A is prevented by the shoulder 24. In this manner, the body assembly 16 remains substantially in the path of the retainer arm 18 (see arrow B) of the pintle hook hitch device 20 when the body assembly 16 is displaced from its equilibrium position by swinging to the side of the shoulder 24 (hereinafter the "first side"). This inhibits the opening of the retainer arm 18 when the body assembly 16 swings to the first side.

Figure 2:
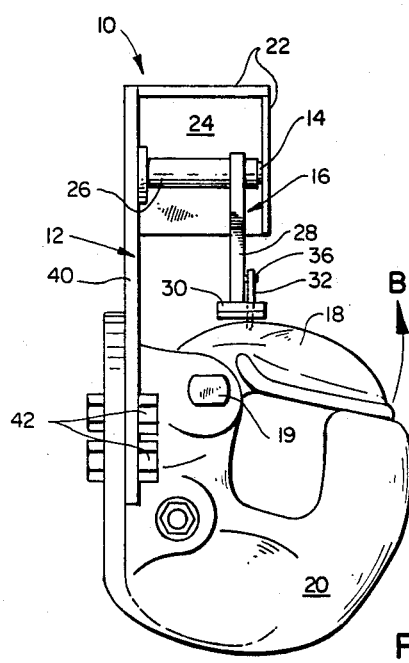
FIG. 2 is a elevational side view of the trailer safety device positioned over the pintle hook hitch device showing the manner in which the body member is suspended.

The body assembly 16 comprises a suspension jacket 26, a body member 28, a shield plate 30, and an inhibitor latch 32. As shown in FIG. 2, the suspension jacket 26 is fixed to the body member 28 and rotatably encases the suspension pin 14. The suspension jacket 26 freely rotates about the longitudinal axis of the suspension pin 14 enabling the body assembly 16 to swing freely about said axis in a direction transverse to the path of the retainer arm 14 as shown by arrow B. It should be understood that the means of suspending the body assembly 16 via a suspension pin 14 and suspension jacket 26 is a preferred embodiment because it is conducive to easy construction, repair or replacement. However, other means of suspension may be used without departing from the teachings or spirit of this invention. For example, the body member 28 may be directly affixed to the suspension pin 14, provided that the suspension pin 14 is free to rotate about its longitudinal axis within the bracket 22.

The body member 28 of the body assembly 16 defines the stem or length of the pendulum-like body assembly 16. At the distal end of the body member 28, the body assembly 16 has a curved shield plate 30 which acts as an abutment against which the retainer arm 18 would strike in the event that it moved appreciably in the vertical direction (defined by arrow B) during use of the trailer safety device of this invention. The shield plate 30 is curved to assure that the body assembly 16 swings free from contact with the retainer arm 18 when the retainer arm 18 is in its fully closed position. Further, the shield plate 30 has a width (as shown in FIG. 2) which is sufficient to reduce the likelihood that a retainer arm 18 will be sheared off. In the preferred embodiment, the shield plate 30 has a notch 34 adjacent the inhibitor latch 32 which enables the inhibitor latch 32 to be manually rotated about a latch pin 36.

Figure 3:
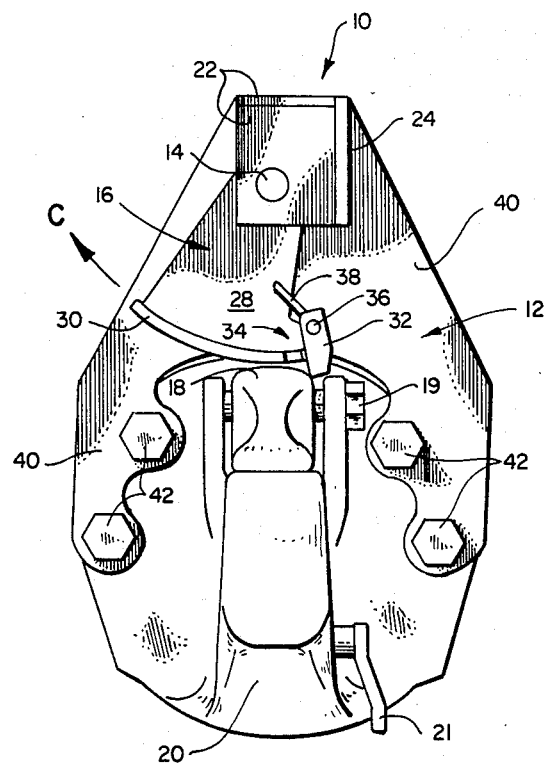
FIG. 3 is an elevational front view of the trailer safety device positioned above the pintle hook hitch showing the inhibitor latch engaging the retainer arm.

The inhibitor latch 32 of the body assembly 16 normally rests such that it protrudes below the surface of the shield plate 30 sufficiently that it will engage the retainer arm 18 in contact if the body assembly 16 swings sufficiently in the direction opposite the shoulder 24 defined by arrow C. When the inhibitor latch 32 engages the retainer arm 18, further swinging movement is blocked in the direction of arrow C (see FIG. 3). The inhibitor latch 32 is located on the body assembly 16 such that when the body assembly 16 swings to the side opposite the bracket shoulder 24 (hereinafter the "second side"), the body assembly 16, and more particularly the shield plate 30, lies directly in the travel path (arrow B) used to open or close the retainer arm 18. Thus, by utilizing the features of the shoulder 24 and the inhibitor latch 32, the body assembly 16, though freely swinging between the points of hindrance created by those features, remains at all times disposed in the travel path (arrow B) of the retainer arm 18. (See FIGS. 1 and 3).

It is preferred that the inhibitor latch 32 have a spring 38 so as to be spring-loaded. In this manner, the inhibitor latch 32 may be manually retracted against the tension of the spring 38 and when released it will return to its resting position protruding below the shield plate 30 because of the recoil of the spring 38.

Figure 4:
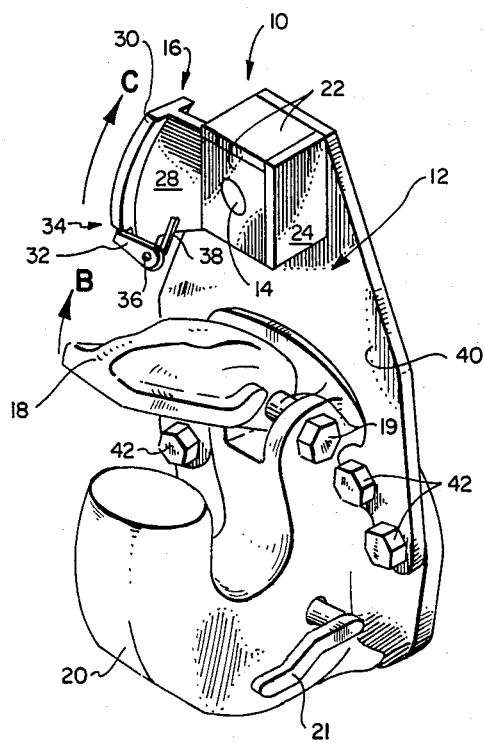
FIG. 4 is a perspective view of the trailer safety device attached to a pintle hook device where the inhibitor latch has been retracted enabling the body member to swing to one side and showing the retainer arm in a partially opened position.

In order to enable the retainer arm 18 of the pintle hook hitch device 20 to move as shown by arrow B and assume its open position, the body assembly 16 must be removed from its normal, free swinging position. This is accomplished by manually rotating the inhibitor latch 32 against the tension of the spring 38 about the latch pin 36 and into the area adjacent the notch 34. In this manner, the inhibitor latch 32 no longer protrudes below the shield plate 30 (see FIG. 4) and it will not engage the retainer arm 18 in contact when the body assembly 16 is moved in the direction shown by arrow C without the inhibitor latch 32 engaging the retainer arm 18. As shown in FIG. 4, the entire body assembly 16 can be swung fully to the second side and away from the retainer arm 18 so that the retainer arm 18 may be opened. When the retainer arm 18 assumes its fully opened position, the operator of the trailer safety device of this invention may release the body assembly 16 which will rest against the opened retainer arm 18. The body assembly 16 will fall into its safety locking position, due to gravity, when the retainer arm 18 is closed. Thus, the trailer safety device of this invention is simple to operate by one operator and presents no serious hazards of pinching or crushing the operator's hands during coupling or uncoupling.

Another embodiment of the present invention utilizes and angled or wedge bottom shield plate 30 as opposed to a curved plate. With this embodiment, it is preferred that the body assembly 16 be suspended in a manner which is offset to the first side from the vertical center of the body member 28 and such that the distance from the point of suspension for the body assembly 16 to any point on the shield plate 30 is less than the distance from the point of suspension to the retainer arm 18. Consequently, a majority of the mass of the body assembly 16, including the shield plate 30 rests suspended towards the first side of center when the body assembly 16 is at equilibrium and during full swing the shield plate 30 will not contact a closed retainer arm 18. In this manner, the body assembly 16, due to gravitational pull, is more resistant to swinging in the direction of arrow C. With the angled or wedge bottom shield plate 30 configuration, and inhibitor latch 32 is not required to block the full swing of the body assembly 16 in the direction of arrow C. This is because the body assembly 16 will not spend an appreciable period of time on the second side or disposed away from the travel path (arrow B) of the retainer arm 18 when bumps or jolts are encountered which cause the body assembly 16 to swing. Although the embodiments described above are preferred, other embodiments may be used.

The mounting support 12, shown in the drawings, is illustrative of a support that can be used to position the trailer safety device of this invention above the pintle hook hitch device 20. The mounting support 12 shown comprises a mounting plate 40 having a plurality of holes in register with the bolts and nuts 42 which secure the pintle hook hitch device 20 to the trailer. With this configuration, the bracket assembly 10 is affixed to the mounting support 12 such that the body assembly 16 is suspended in its operating position. The specific type of mounting support 12 to be utilized in conjunction with the trailer safety device of this invention depends upon the configuration of the existing pintle hook hitch device 20. Thus, it should be understood that other types of mounting supports 12 may be used to position the trailer safety device into its operating position.

It is evident from the foregoing that the trailer safety device of this invention should be constructed of a sturdy material such as steel or cast iron. However, the trailer safety device may be constructed of any sturdy material capable of withstanding the shocks and jolts incident to towing a trailer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A safety device to be used in conjunction with a trailer coupling having a movably operable member capable of being moved substantially vertically to effect the opening or closing of the trailer coupling comprising:
   a bracket assembly capable of being secured in position above the movably operable member of the trailer coupling;
   means for securing said bracket assembly in position above the movably operable member of the trailer coupling;
   a free-swinging body assembly suspended from said bracket assembly and positioned in spaced relationship above the movably operable member of the trailer coupling thereby blocking the movably operable member from substantial upward vertical movement to open the trailer coupling; said body assembly being manually retractable to enable upward vertical movement of the movably operable member opening the trailer coupling; and
   limitation means for restricting the arcuate motion of said free-swinging body assembly such that said body assembly is maintained in a position above the movably operable member unless manually displaced.

2. A safety device as set forth in claim 1 wherein said free-swinging body assembly swings in an arc defining a plane substantially transverse to a plane defined by the line of substantial vertical movement of the movably operable member of the trailer coupling.

3. A safety device as set forth in claim 2 wherein said limitation means further comprises a shoulder positioned on said bracket assembly spaced from the line of equilibrium of said body assembly in the line of movement of said free-swinging body assembly and inhibiting said body assembly from reaching the apex of its swinging arc when swinging to the shoulder side of the line of equilibrium, thereby assuring that said body assembly remains positioned to block opening movement of the movably operable member of the trailer coupling when swinging to such side.

4. A safety device as set forth in Claim 1 wherein said bracket assembly further comprises a stationary suspension pin and said body assembly comprises a suspension jacket which encircles and is capable of rotating about the longitudinal axis of said suspension pin.

5. A safety device as set forth in claim 1 wherein said body assembly further comprises a suspension pin connected in rotatable engagement about its own longitudinal axis within said bracket assembly.

6. A safety device as set forth in claim 1 wherein said body assembly further comprises a shield plate located at its distal end for abutment with the movably operable member of the trailer coupling in the event of vertical upward movement thereof during the use of said safety device.

7. A safety device as set forth in claim 6 wherein said shield plate is curved so as not to contact the trailer coupling, when closed, at any point in the arc of swing of said body assembly.

8. A safety device as set forth in claim 1 wherein said limitation means further comprises an inhibitor latch connected at the distal end of said body assembly which protrudes below said body member assembly for engagement with the movably operable member thereby inhibiting said body assembly from reaching the apex of its swinging arc in one direction from the point of equilibrium of said arc.

9. A safety device as set forth in claim 8 wherein said inhibitor latch is manually retractable to prevent engagement with the trailer coupling and to permit movement of said body assembly to an apex of its swinging arc, thereby enabling the trailer coupling to be opened or closed.

10. A safety device as set forth in claim 8 wherein said inhibitor latch is spring-loaded such that it is manually retractable against the tension of the spring and, when released, returns to its position which protrudes below said body assembly.

11. A safety device as set forth in claim 1 wherein the free-swinging body assembly is elongated and suspended from said bracket assembly offset from the longitudinal center of said free-swinging body assembly.

12. A safety device as set forth in claim 11 wherein said free-swinging body assembly swings in an arc defining a plane substantially transverse to a plane defined by the line of substantial vertical movement of the movably operable member of the trailer coupling.

13. A safety device as set forth in claim 12 wherein said limitation means further comprises a shoulder on said bracket assembly positioned spaced from the line of equilibrium of said body assembly in the line of movement of said free-swinging body assembly and inhibiting said body assembly from reaching the apex of its swinging arc when swinging to the shoulder side of the line of equilibrium, thereby assuring that said body assembly remains positioned to block opening movement of the movably operable member of the trailer coupling when swinging to such side.

14. A safety device as set forth in claim 11 wherein said bracket assembly further comprises a stationary suspension pin and said body assembly comprises a suspension jacket which encircles and is capable of rotating about the longitudinal axis of said suspension pin.

15. A safety device as set forth in claim 11 wherein said body assembly further comprises a suspension pin connected in rotatable engagement about its own longitudinal axis within said bracket assembly.

16. a safety device as set forth in claim 11 wherein said body assembly further comprises a shield plate located at its distal end for abutment with the movably operable member of the trailer coupling in the event of vertical upward movement thereof during the use of said safety device.

17. A safety device as set forth in claim 16 wherein said shield plate is straight and angularly disposed at the distal end of said body assembly such that the distances from the point of suspension for said body assembly to any point on said shield plate are less than the distance from such point of suspension to the movably operable member.

* * * * *